United States Patent
Nakamura

(10) Patent No.: US 12,041,357 B2
(45) Date of Patent: Jul. 16, 2024

(54) IN-VEHICLE CAMERA

(71) Applicant: DENSO CORPORATION, Kariya (JP)

(72) Inventor: Kenji Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 106 days.

(21) Appl. No.: 17/645,425

(22) Filed: Dec. 21, 2021

(65) Prior Publication Data

US 2022/0201184 A1 Jun. 23, 2022

(30) Foreign Application Priority Data

Dec. 23, 2020 (JP) ................................ 2020-213919

(51) Int. Cl.
*H04N 23/73* (2023.01)
*B60W 40/02* (2006.01)

(52) U.S. Cl.
CPC ............ *H04N 23/73* (2023.01); *B60W 40/02* (2013.01); *B60W 2420/403* (2013.01)

(58) Field of Classification Search
CPC ........ H04N 23/61; H04N 23/60; H04N 23/00; H04N 23/73; H04N 23/72; H04N 23/6811; H04N 23/681; H04N 23/68; H04N 23/689; H04N 25/531; H04N 25/05; H04N 25/53; B60W 40/02; B60W 2420/42; B60W 2420/40
USPC ...... 348/148, 296, 5.037, 5.028, 56, 367, 55
See application file for complete search history.

(56) References Cited

U.S. PATENT DOCUMENTS

| 7,019,775 | B2 * | 3/2006 | Matsumoto | H04N 25/63 348/222.1 |
| 9,332,192 | B2 * | 5/2016 | Shimizu | H04N 23/73 |
| 2008/0056537 | A1 * | 3/2008 | Furusawa | G06V 20/588 382/104 |
| 2011/0037853 | A1 * | 2/2011 | Shiraishi | G08G 1/166 348/148 |
| 2011/0164172 | A1 * | 7/2011 | Shintani | G03B 9/36 348/E5.037 |
| 2012/0147201 | A1 * | 6/2012 | Asukabe | H04N 23/6812 348/208.1 |
| 2012/0147234 | A1 * | 6/2012 | Asukabe | G03B 7/18 348/E5.037 |

(Continued)

FOREIGN PATENT DOCUMENTS

| JP | 2002027448 A | 1/2002 |
| JP | 2005318568 A | 11/2005 |

(Continued)

*Primary Examiner* — Christopher S Kelley
*Assistant Examiner* — Asmamaw G Tarko
(74) *Attorney, Agent, or Firm* — MASCHOFF BRENNAN

(57) ABSTRACT

The in-vehicle camera includes an image sensor, a shutter, an image processing unit, and an exposure control unit. The image sensor includes multiple pixels to collect optical information. The shutter is a front curtain electronic type that includes a front curtain of an electronic type and a rear curtain of any type. An electronic controller starts collection of optical information in each pixel thereby opening the shutter. The image processing unit generates an image based on the optical information as collected. The exposure control unit controls the shutter to allow shutter times, during which the shutter is open for first and second image sensor areas obtained by dividing pixels P of the image sensor 15 into multiple areas, to be different from each other.

20 Claims, 10 Drawing Sheets

(56) References Cited

U.S. PATENT DOCUMENTS

| | | | | |
|---|---|---|---|---|
| 2013/0329128 | A1* | 12/2013 | Kaizu | H04N 23/73 |
| | | | | 348/367 |
| 2016/0323492 | A1* | 11/2016 | Matsuhashi | H04N 23/673 |
| 2017/0054905 | A1* | 2/2017 | Iwasaki | H04N 25/531 |
| 2017/0155854 | A1* | 6/2017 | Hasuda | G03B 9/42 |
| 2018/0176463 | A1* | 6/2018 | Shintani | H04N 23/632 |
| 2019/0182443 | A1* | 6/2019 | Hanzawa | H04N 25/76 |
| 2019/0212633 | A1* | 7/2019 | Honda | G03B 9/18 |
| 2019/0356834 | A1* | 11/2019 | Yana | H04N 23/73 |
| 2020/0012172 | A1* | 1/2020 | Irie | H04N 23/63 |
| 2020/0154023 | A1* | 5/2020 | Sato | B64C 39/024 |
| 2020/0259983 | A1* | 8/2020 | Aoki | H04N 23/6811 |
| 2020/0364564 | A1* | 11/2020 | Barnwal | G06N 3/04 |

FOREIGN PATENT DOCUMENTS

| | | |
|---|---|---|
| JP | 2008174078 A | 7/2008 |
| JP | 2011023962 A | 2/2011 |
| JP | 4679469 B2 | 4/2011 |
| JP | 2017-055260 A | 3/2017 |
| JP | 2017225084 A | 12/2017 |

\* cited by examiner

IN-VEHICLE CAMERA

CROSS-REFERENCE TO RELATED APPLICATION

This patent application is based on and claims priority to Japanese Patent Application No. 2020-213919, filed on Dec. 23, 2020 in the Japan Patent office, the entire disclosure of which is hereby incorporated by reference herein.

BACKGROUND

Technical Field

The present disclosure relates to an in-vehicle camera that is mountable on a vehicle (e.g., an own vehicle) and captures images of an outside of the own vehicle by taking a video.

Related Art

Some conventional in-vehicle cameras have an image sensor, a shutter, and an image processor. The image sensor collects optical information generated based on an intensity of light with which each pixel included in the image sensor is irradiated during a shutter time. Then, based on the optical information, the conventional image processor generates an image.

In general, when a relative position of an object to a camera changes within a shutter time, blurring of the object occurs in a camera image captured during the shutter time. For example, such blurring occurs due to either advance of a vehicle having an in-vehicle camera or movement of the subject.

In such a system, when the shutter time is increased, although a signal to noise ratio (SNR) obtained by dividing an intensity of an electrical signal indicating optical information by a noise intensity increases, blurring increasingly occurs. By contrast, when the shutter time is reduced, although the blurring is reduced, the SNR unfavorably decreases. Further, in general, an image has an area where the SNR is prioritized because blurring relatively rarely occurs there. The image also has other areas where blurring suppression is prioritized because blurring relatively readily occurs there.

To deal with such a problem, it is possible to perform both long shutter imaging and short shutter imaging one after another. However, since one frame obtained by the long shutter imaging and another frame obtained by the short shutter imaging substantially constitute one frame, a frame rate is thereby reduced.

The present disclosure has been made to address and resolve the above-described problem, and it is a principal object of the present disclosure to maintain the SNR while suppressing blurring without substantially reducing the frame rate.

SUMMARY

Accordingly, one aspect of the present disclosure provides a novel in-vehicle camera (50) mountable on an own vehicle to capture images of an outside scenery from an own vehicle by means of videos. The in-vehicle camera comprises an image sensor having multiple pixels, respectively, to collect optical information and an electronic front curtain shutter with an electronic front curtain and a rear curtain. The shutter opens when collection of the optical information is started by electronic control. The in-vehicle camera further comprises: an image processing unit to generate an image based on the optical information as collected; and an exposure control unit to control the shutter to allow a shutter time, during which the shutter is open, to be different in accordance with the image sensor area.

Another aspect of the present disclosure provides a novel method of capturing images of an outside scenery with an in-vehicle camera mountable on an own vehicle by means of videos. The method comprises the steps of: A method of capturing images of an outside scenery with an in-vehicle camera mountable on an own vehicle by means of videos, the method comprising the steps of: capturing images of an outside scenery as optical information in an image sensor composed of multiple image sensor areas with multiple pixels, respectively, collecting the optical information by opening an electronic front curtain shutter composed of an electronic front curtain and a rear curtain; and generating an image in an image processing unit based on the optical information as collected. The method comprises the step of controlling the electronic front curtain shutter with an exposure control unit to allow a shutter time, during which the shutter is open, to be different in accordance with image sensor area.

Hence, according to the present disclosure, the shutter of the electronic front curtain is used to control the shutter time to allow each of the image sensor areas to be different from each other. Hence, the shutter time can be increased in an area where an SNR is prioritized, and the shutter time can be decreased in an area where blurring suppression is prioritized. Besides, according to this embodiment, a given frame rate can be maintained as different from a situation in which both long shutter imaging and short shutter imaging are performed in order. This is because, two frames obtained in this way do not substantially become one frame. Accordingly, the frame rate does not substantially decrease.

That is, when first and second frames are captured by using a long shutter and a short shutter, alternately, an area where an SNR is prioritized is taken by the first frame, and an area where suppression of blurring is prioritized is then taken by the second frame. As a result, one frame is practically taken by these two frames.

By contrast, according to one embodiment of the present disclosure, since two areas are taken simultaneously with two respective long and short shutters, capturing of an image is completed by one frame. That is, two frames are not needed to provide one frame. Hence, it is possible to achieve both the SNR and the suppression of blurring while maintaining a given frame rate.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
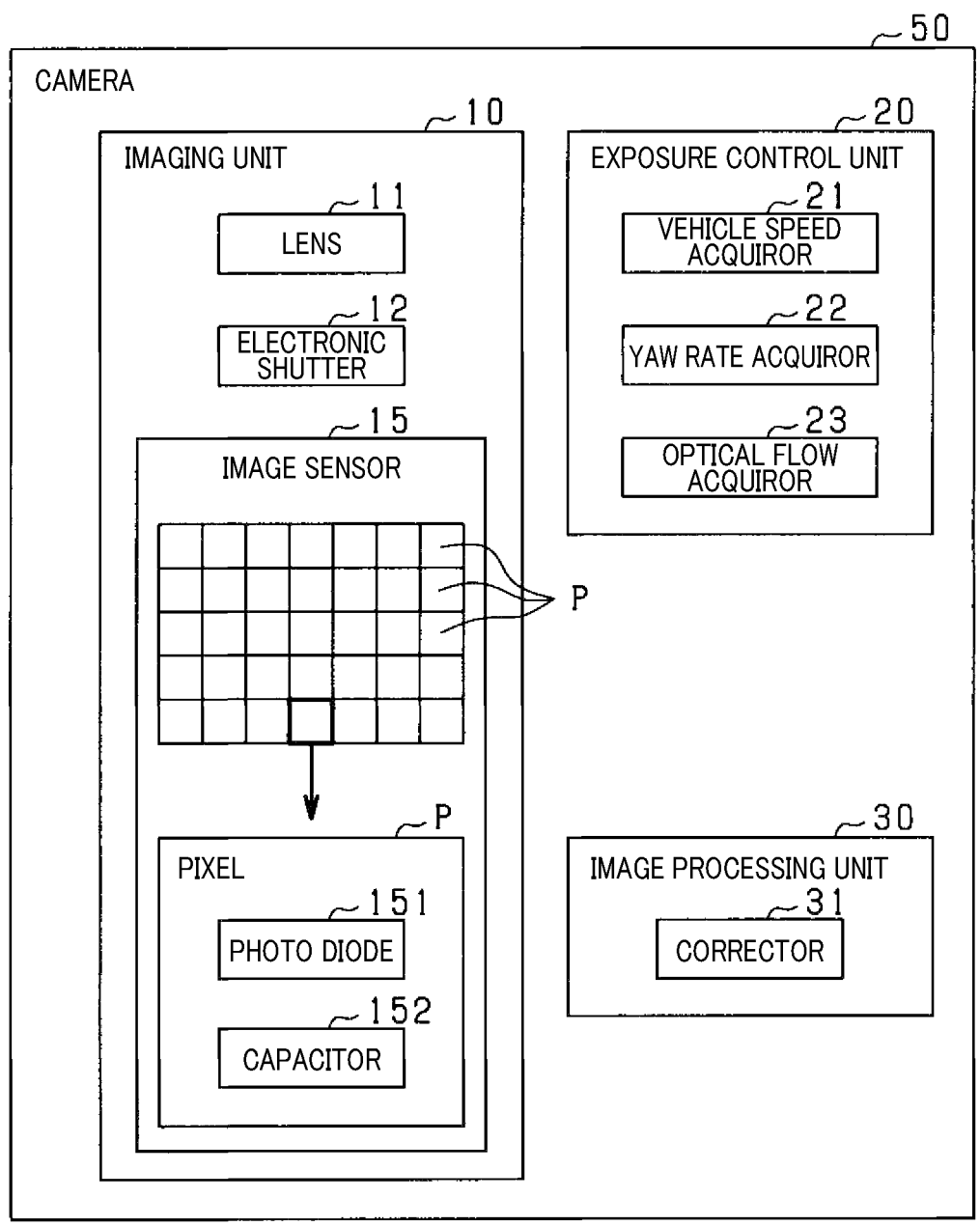
FIG. 1 is a diagram schematically illustrating a camera according to a first embodiment of the present disclosure.

Referring now to the drawings, wherein like reference numerals designate identical or corresponding parts throughout the several views thereof, and to FIGS. 1 to 4, a camera according to a first embodiment of the present disclosure will be herein below described.

In FIG. 1, a camera 50 employed in this embodiment is schematically illustrated. The camera 50 is an in-vehicle camera that is mountable on a vehicle (i.e., an own vehicle) and captures images of a scene in front of the own vehicle with a video. For example, the camera 50 can be used in driving assistance, such as a lane keeping control, automatic cruise control, pre-crash safety (collision avoidance and collision damage reduction) control, etc. The camera 50 can be also used to store images in a drive recorder. The camera 50 includes an imaging unit 10, an exposure control unit 20, and an image processing unit 30.

The imaging unit 10 includes a lens 11, an electronic shutter 12, and an image sensor 15. The lens 11 gathers light and irradiates the image sensor 15 therewith. The image sensor 15 is composed of either a CCD (Charge Coupled Diode) sensor or a CMOS (Complementary Metal Oxide Semiconductor) sensor, and the like. The image sensor 15 includes multiple pixels P each including a photodiode 151 and a capacitor 152 to collect optical information. Hence, when the electronic shutter 12 is open and the photodiode 151 of each of the pixels P is irradiated with the light during a given shutter time, the capacitor 152 of the pixel P charges with a current generated according to an intensity of the light with which the photodiode 151 is irradiated.

Hence, each of a front curtain and a rear curtain of the electronic shutter 12 is not a mechanical type but an electronic type. Specifically, initiation of charging of the capacitor 152 with electricity in each of the pixels P by performing electronic control corresponds to opening of the front curtain (i.e., electronic front curtain). That is, initiation of collecting the optical information in each of the pixels P by performing electronic control corresponds to opening of the electronic shutter 12. Further, initiation of reading voltage information from the capacitor 152 corresponds to closing of the rear curtain which is, initiation of reading the optical information collected by each of the pixels P corresponds to closing of the electronic shutter 12. After reading, the optical information is transmitted to the image processing unit 30.

The image processing unit 30 performs image processing based on the optical information and generates an image 35. The exposure control unit 20 controls an aperture (not illustrated) included in the imaging unit 10 and the electronic shutter 12, thereby controlling exposure of the imaging unit 10.

Figure 2:
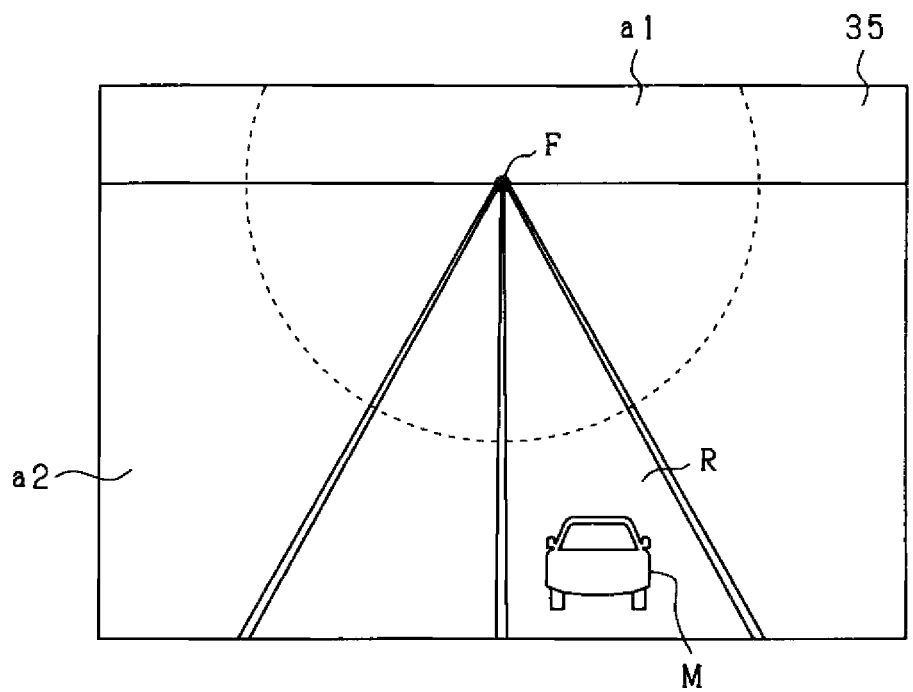
FIG. 2 is a diagram schematically illustrating an example of an image captured by the camera according to the first embodiment of the present disclosure.
Figure 3:
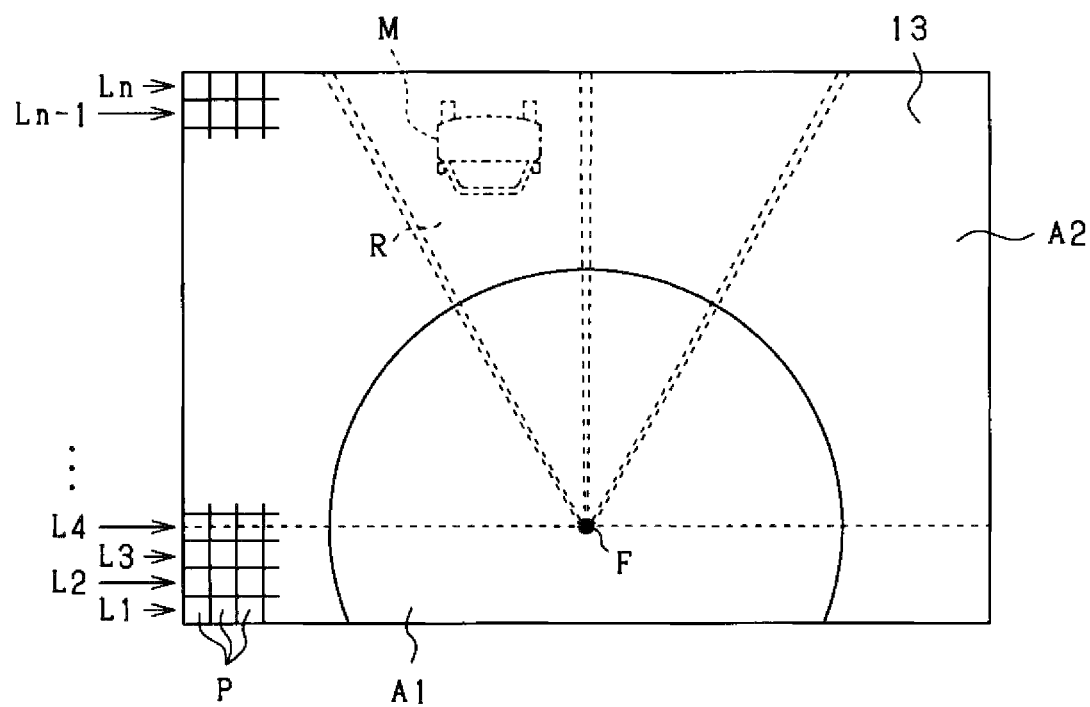
FIG. 3 is a diagram schematically illustrating an image sensor according to the first embodiment of the present disclosure.

FIG. 2 is a diagram schematically illustrating an example of the image 35 generated by the image processing unit 30. FIG. 3 is a plan view illustrating a state of the image sensor 15 when it captures the image 35 illustrated in FIG. 2. In FIG. 3, each of the pixels P included in the image sensor 15 is exaggeratedly illustrated when compared to an actual pixel P, for visibility. Herein below, groups in which pixels P are arranged laterally are referred to as lines L1 to Ln. That is, these lines L1 to Ln start from a first line L1 to a final line Ln as illustrated.

Next, a problem to be addressed and resolved in this embodiment will be herein below described in detail. In general, the longer the shutter time, the larger the SNR, but the greater the blurring. By contrast, if the shutter time is reduced, although the blurring reduces, the SNR also decreases unfavorably. Further, the image 35 generally includes an area where a SNR is prioritized because the blurring comparatively rarely occurs there. Also, the image 35 generally includes other areas where suppression of blurring is prioritized because the blurring comparatively readily occurs there.

For example, as illustrated in FIG. 2, when a road R extends linearly in a direction in which an own vehicle is running, a first image area a1 in the image 35 has a circular shape containing an infinite portion F of the road R at a center thereof. By contrast, an outer area of the first image area a1 in the image 35 serves as a second image area a2 thereof. Accordingly, as illustrated in FIG. 3, a first image sensor area A1 of the image sensor 15 is an area for imaging the first image area a1 of the image 35 illustrated in FIG. 2. By contrast, a second image sensor area A2 of the image sensor 15 illustrated in FIG. 3 is an area for imaging the second image area a2 of the image 35 illustrated in FIG. 2.

Hence, the first image sensor area A1 (equivalent to the first image area a1) is an area where the SNR is prioritized, because a distant place from the own vehicle is imaged, and accordingly, the blurring is reduced. By contrast, the second image sensor area A2 (equivalent to the second image area a2) is an area where suppression of blurring is prioritized, because the camera captures images of the vicinity of the own vehicle closer than the first image sensor area A1, and accordingly, an amount of blurring is greater than that in the first image sensor area A1.

In view of this, the exposure control unit 20 designates a first shutter time T1 as a shutter time to the first image sensor area A1 (equivalent to the first image area a1). By contrast, to the second image sensor area A2 (equivalent to the second image area a2), a second shutter time T2 shorter than the first shutter time T1 is designated as the other shutter time. These details will be described herein below.

Figure 4:
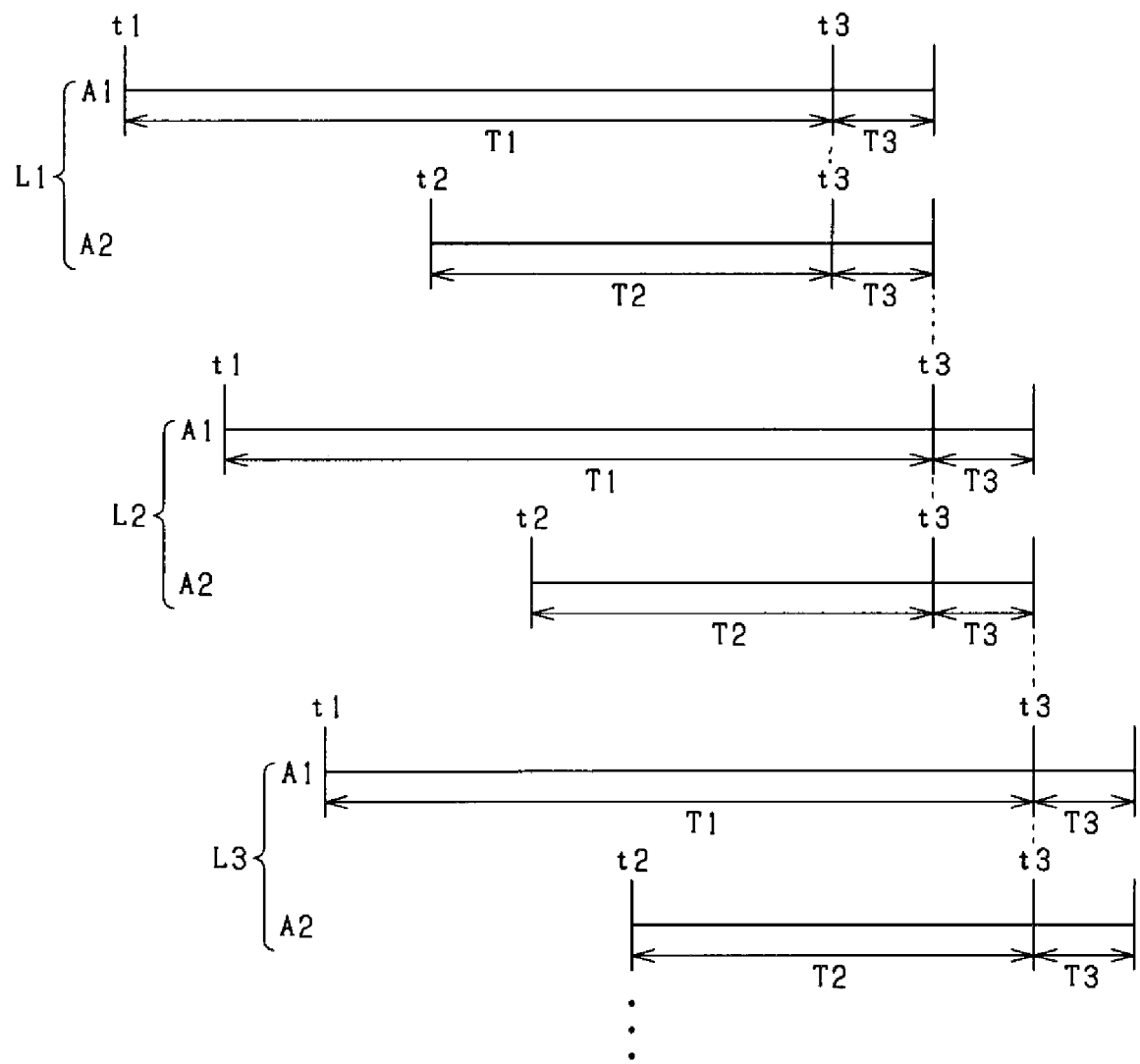
FIG. 4 is a time chart illustrating a control sequence of controlling an electronic shutter according to the first embodiment of the present disclosure.

FIG. 4 is a time chart illustrating a control sequence performed when the exposure control unit 20 controls the electronic shutter 12. The electronic shutter 12 may be a so-called rolling shutter. Hence, voltage information is read from each of the capacitors 152 and the shutter 12 is accordingly closed, in order from the first line L1 to the final line Ln. Hence, since a reading time T3 is required for reading the voltage information from the capacitor 152 in each of the lines L1 to Ln, a timing t3 at which the electronic shutter 12 is closed in each of the lines L1 to Ln is offset by the reading time T3.

Further, as illustrated by a time chart (L1:A1) at the top of FIG. 4, the exposure control unit 20 opens the electronic shutter 12 at the first timing t1 in the first line L1 for each of the pixels P on the first line L1 belonging to the first image sensor area A1. as illustrated, the first timing t1 in the first line L1 is earlier than a timing t3 at which the electronic shutter 12 is closed in the first line L1 by a first shutter time T1.

By contrast, as illustrated by a second time chart (L1:A2) located at a second place from the top of FIG. 4, the exposure control unit 20 opens an electronic shutter 12 at a second timing t2 in the first line L1 for each of the pixels P on the first line L1 belonging to the second image sensor area A2. As illustrated, the second timing t2 on the first line L1 is earlier than the timing t3 at which the electronic shutter 12 is closed in the first line L1, by a second shutter time T2.

That is, there is a difference in timing between the first timing t1 for the first area A1 and the second timing t2 for the second area A2. This is because since the area A1 is defined as a SNR priority area and needs a longer shutter time than the area A2 defined as an area given a priority to suppression of blurring, the first timing t1 precedes the second timing t2 (i.e., the first timing t1 is earlier than the second timing t2).

Further, As illustrated by a third time chart (L2:A1) located at a third place from the top of FIG. 4, the exposure control unit 20 opens an electronic shutter 12 at a first timing t1 in a second line L2 for each of the pixels P on the second line L2 belonging to the first image sensor area A1. As illustrated, the first timing t1 in the second line L2 is earlier than the timing t3 at which the electronic shutter 12 is closed in the second line L2, by the first shutter time T1.

By contrast, as illustrated by a fourth time chart (L2:A2) located at a fourth place from the top of FIG. 4, the exposure control unit 20 opens an electronic shutter 12 at a second timing t2 in the second line L2 for each of the pixels P on the second line L2 belonging to the second image sensor area A2. As illustrated, the second timing t2 in the second line L2 is earlier than the timing t3 at which the electronic shutter 12 is closed in the second line L2, by the second shutter time T2.

Hence, in any one of the lines L1 to Ln, the exposure control unit 20 opens the electronic shutter 12 for the pixels P in each of the lines L1 to Ln belonging to the first image sensor area A1 at the first timing t1 which is earlier than the timing t3 at which the electronic shutter 12 is closed in each of the lines L1 to Ln, by the first shutter time T1. By contrast, the exposure control unit 20 opens the electronic shutter 12 for each of the pixels P in each of the lines L1 to Ln belonging to the second image sensor area A2 at the second timing t2 which is earlier than the timing t3 at which the electronic shutter 12 is closed in each of the lines L1 to Ln, by the second shutter time T2.

Hence, in the respective lines L1 to Ln, these first timings t1, the second timings t2, and the timings t3 at which the electronic shutter 12 are closed are different from each other. However, in any one of the lines L1 to Ln, the same first shutter time T1 is designated for each of the pixels P belonging to the first image sensor area A1. Similarly, the same second shutter time T2 is designated for each of the pixels P belonging to the second image sensor area A2.

Further, the image processing unit 30 includes a corrector 31 as illustrated in FIG. 1. The corrector 31 increases a gain of a measurement result in the second image area a2 illustrated in FIG. 2 more than that in the first image area a1 illustrated in FIG. 2. With this, the second image area a2 is prevented from darkening more than the first image area a1 due to a difference in shutter time (T1−T2) between the first shutter time T1 and the second shutter time T2. Specifically, the corrector 31 reduces the gain when the shutter time is relatively long, and increases the gain when the shutter time is relatively short. Hence, a brightness of each of the first image area a1 and the second image area a2 is controlled to approximate an actual brightness, thereby preventing a boundary from appearing at which the brightness changes between the first image area a1 and the second image area a2.

Further, as illustrated in FIG. 1, The exposure control unit 20 includes a vehicle speed acquirer 21, a yaw rate acquirer 22, and an optical flow acquirer 23. The vehicle speed acquirer 21 acquires a speed of an own vehicle. The yaw rate acquirer 22 acquires a yaw rate of the own vehicle. The optical flow acquirer 23 acquires an optical flow caused by movement of an object as a target of the imaging unit 10. Then, the exposure control unit 20 designates the shutter times T1 and T2 to each of the areas A1 and A2 based on the speed of the own vehicle, the yaw rate of the own vehicle, and the optical flow as will be described hereinbelow more in detail.

Specifically, the exposure control unit 20 controls the shutter 12 to allow the respective shutter times T1 and T2 for the areas A1 and A2 of FIG. 3 to be shorter when the own vehicle is running at a given speed or higher than when the own vehicle is running less than the given speed. That is, the exposure control unit 20 controls the shutter 12 to allow the respective shutter times T1 and T2 for the areas A1 and A2 to be shorter when the own vehicle is running relatively faster than when the own vehicle is running relatively slower. For example, the exposure control unit 20 controls the shutter 12 to allow the respective shutter times T1 and T2 for these areas A1 and A2 as the own vehicle runs faster. This because, the faster the own vehicle, the faster the scenery flows in both the first image sensor area A1 and the second image sensor area A2.

In such a situation, the exposure control unit 20 greatly changes the second shutter time T2 by more than the first shutter time T1. With this, when the own vehicle is running relatively faster, the exposure control unit 20 greatly increases the difference in shutter time (T1−T2) between the first shutter time T1 and the second shutter time T2 as compared to a situation where it runs relatively slower. That is, if the second shutter time T2 is more greatly changed than the first shutter time T1 when a running speed of an own vehicle increases and these shutter times T1 and T2 are to be shortened, the difference in shutter time (T1−T2) is increased.

For example, the exposure control unit 20 increases the difference in shutter time (T1−T2) as the own vehicle runs faster. That is because, the faster the own vehicle runs, the greater the difference between the speeds at which landscapes flow in the first image sensor area A1 (corresponding to the first image area a1) and the second area A2 (corresponding to the second image area a2), respectively.

Further, the exposure control unit 20 controls the shutter 12 to allow the shutter times T1 and T2 for the respective areas A1 and A2 to be shorter when the yaw rate is larger than a given rate than when the yaw rate is smaller than or equal to the given rate, that is, when law rate is relatively large. For example, the exposure control unit 20 controls the shutter 12 to allow the shutter time T1 and T2 for the respective areas A1 and A2 to be shorter as the yaw rate increases. This is because, the higher the yaw rate, the faster the sceneries flow in both the first image sensor area A1 (corresponding to the first image area a1) and the second image sensor area A2 (corresponding to the second image area a2), respectively. In such a situation, the shutter times T1 and T2 for the respective area A1 and A2 may be reduced equally or differently from each other, for example.

Further, based on the optical flow, the exposure control unit 20 controls the shutter 12 to allow a shutter time at least for the area (A2 in FIG. 3), in which a moving body M such as an oncoming vehicle illustrated in FIG. 2, etc., is found and imaged, to be shorter than a situation when the moving body M is not found. This is because an image of the moving body M becomes easily blurred due to movement of the moving body M. Here, the moving body M can be an object simply recognized as moving relative to a road R. Otherwise, the moving body M can be another object, recognized as moving in a direction along the road R, of which a relative speed to the own vehicle increases.

Further, as described heretofore, the exposure control unit 20 determines the shutter times T1 and T2 for the respective areas A1 and A2 based on the speed of the own vehicle, the yaw rate of the own vehicle, and the optical flow in total. Herein below, a specific method of determining the shutter times T1 and T2 in total will be described.

First, the exposure control unit 20 designates blurring indexes b1 and b2 to the respective areas A1 and A2, for example. In such a situation, a second blurring index b2 as an index for the second image sensor area A2 is made larger than a first blurring index b1 as an index for the first image sensor area A1. Further, the blurring indexes b1 and b2 for the respective areas A1 and A2 are increased as the own vehicle runs faster. In such a situation, a difference in index between the first blurring index b1 and the second blurring index b2 (i.e., b2−b1) is increased as the own vehicle runs faster. Furthermore, the blurring indexes b1 and b2 for the respective areas a1 and a2 may be equally increased as the yaw rate increases, for example. Further, based on the optical flow, the blurring index for the area (e.g., a2 in FIG. 3), where a given moving body M is recognized is increased.

Then, based on the blurring indexes b1 and b2 as finally determined for the respective areas A1 and A2, the shutter times T1 and T2 for the respective areas A1 and A2 are determined. That is, for the respective areas A1 and A2, the shutter times T1 and T2 are reduced as the blurring indexes b1 and b2 as finally determined increase. With this, based on the speed of the own vehicle, the yaw rate of the own vehicle, and the optical flow, the shutter times T1 and T2 of the respective areas A1 and A2 can be collectively determined.

Hereinbelow, various advantages provided by the above-described embodiment are summarized.

First, the exposure control unit 20 reduces the second shutter time T2 to be less than the first shutter time T1. With this, the SNR is prioritized in the first image sensor area A1, in which blurring occurs relatively little due to imaging of a distance relatively away from the own vehicle. By contrast, blurring suppression is given a priority in the second image sensor area A2, in which blurring relatively easily occurs due to imaging of a vicinity of the own vehicle. Besides, according to this embodiment, a given frame rate can be maintained as different from a situation, in which both long shutter imaging and short shutter imaging are performed in order to generate two frames substantially becoming one frame, thereby substantially decreasing the frame rate. Hence, it is possible to achieve both the SNR and the suppression of blurring while maintaining the actual frame rate.

Further, the exposure control unit 20 controls the shutter 12 to allow the shutter times T1 and T2 for the respective areas A1 and A2 to be shorter when the own vehicle runs relatively faster than when it runs relatively slowly. Hence, the shutter times T1 and T2 for the respective area A1 and A2 can be reduced when the landscape flows quickly and accordingly blurring easily occurs.

Further, the exposure control unit 20 controls the shutter 12 to allow the difference in shutter time (T1−T2) between the first shutter time T1 and the second shutter time T2 to increase when the own vehicle runs relatively faster than when it runs relatively slower. Hence, the difference in shutter time (T1−T2) can be increased when the own vehicle runs at a high speed, and accordingly, a difference in flow speed between a distant landscape and a nearby landscape increases.

Further, the exposure control unit 20 controls the shutter 12 to allow the shutter times T1 and T2 for the respective areas A1 and A2 to be shorter when the yaw rate of the own vehicle is relatively high than when the yaw rate of the own vehicle is relatively low. Hence, the shutter times T1 and T2 for the respective areas A1 and A2 can be reduced at a high yaw rate time when the own vehicle turns, and accordingly a scenery flows quickly resulting in easy blurring.

Further, when it is found based on the optical flow that the moving body M is present, the exposure control unit 20 controls the shutter to allow a shutter time for an area where the moving body M is imaged to be shorter. Hence, the shutter time for the area in which the blurring readily occurs due to movement of the moving body M can be reduced.

Further, in this embodiment, since the electronic shutter 12 employs the rolling shutter, the timing t3 at which the electronic shutter 12 is closed in each of the lines L1 to Ln (of the pixels P) is different (i.e., the timing t3 in the line Ln is shifted backward). By contrast, the exposure control unit 20 opens the electronic shutter 12 for the pixels P on each of the lines L1 to Ln belonging to the first image sensor area A1 at the first timing t1 in each of the lines L1 to Ln, which is a time earlier than the timing t3 at which the electronic shutter 12 is closed by the first shutter time T1 in each of the lines L1 to Ln. Further, the exposure control unit 20 opens the electronic shutter 12 for the pixels P on each of the lines L1 to Ln belonging to the second image sensor area A2 at the second timing t2 in each of the lines L1 to Ln, which is a time earlier than the timing t3 at which the electronic shutter 12 is closed in each of the lines L1 to Ln, by the second shutter time T2. Hence, in any one of the lines L1 to Ln, the same first shutter time T1 can be designated for the pixels P belonging to the first image sensor area A1. At the same time, the same second shutter time T2 can be designated for the pixels P belonging to the second image sensor area A2.

Next, a second embodiment will be described hereinbelow in detail. In the blow described embodiment, the same number is assigned to the same or corresponding devices and members or the like as assigned to in the previous embodiment. Further, this embodiment is mainly described based on a different point from the first embodiment, and description of the same or similar portion as the first embodiment is herein below omitted.

Figure 5:
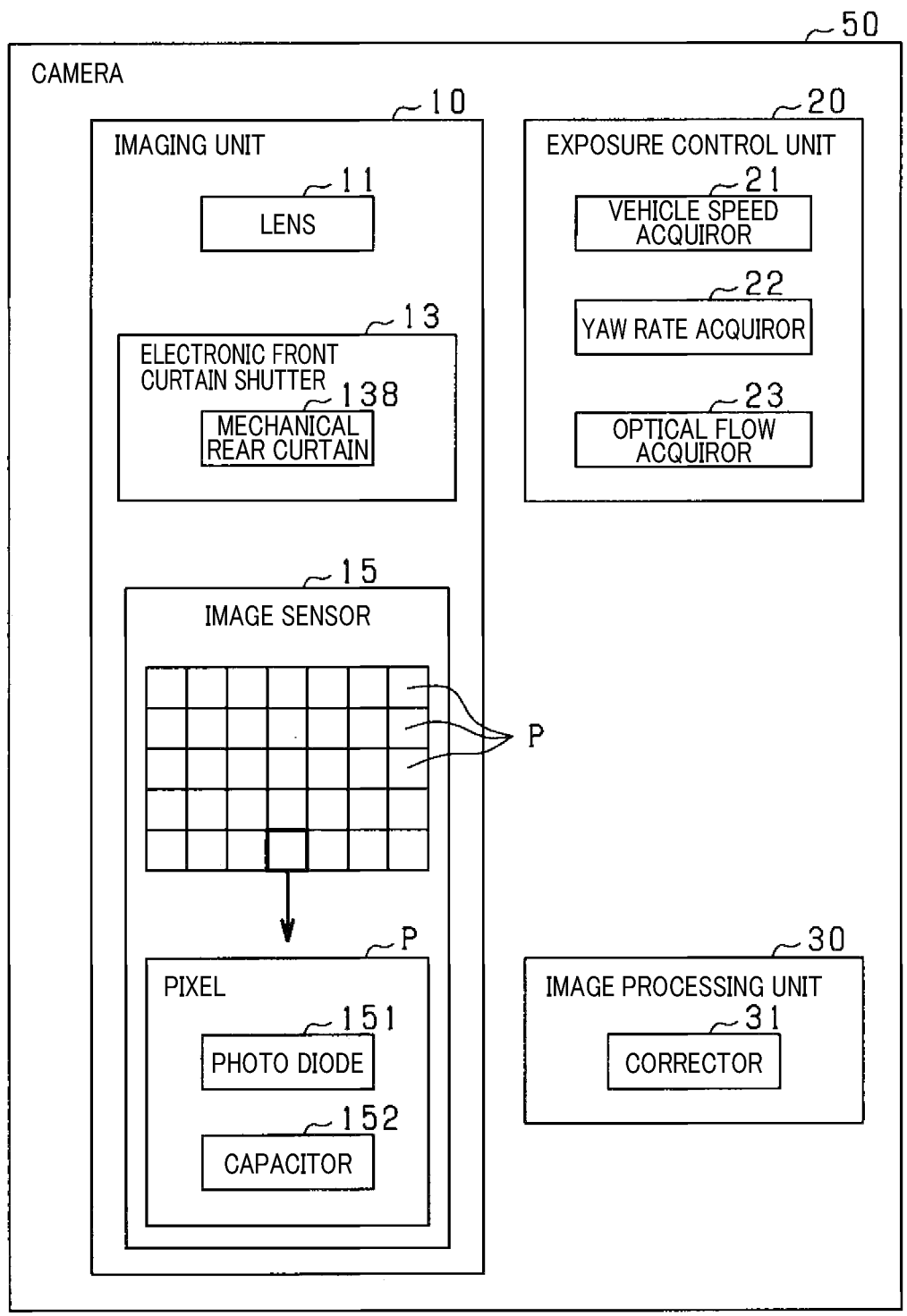
FIG. 5 is a diagram schematically illustrating a camera according to a second embodiment of the present disclosure.

FIG. 5 is a diagram schematically illustrating a camera 50 employed in this embodiment. This embodiment employs an electronic front curtain shutter 13 instead of the electronic shutter 12 used in the first embodiment. The electronic front curtain shutter 13 is composed of an electronic front curtain and a mechanical rear curtain 138. That is, among the front curtain and the rear curtain, only the front curtain is an electronic type. Hence, an action of closing the mechanical rear curtain 138 corresponds to an action of closing the electronic front curtain shutter 13.

Figure 6:
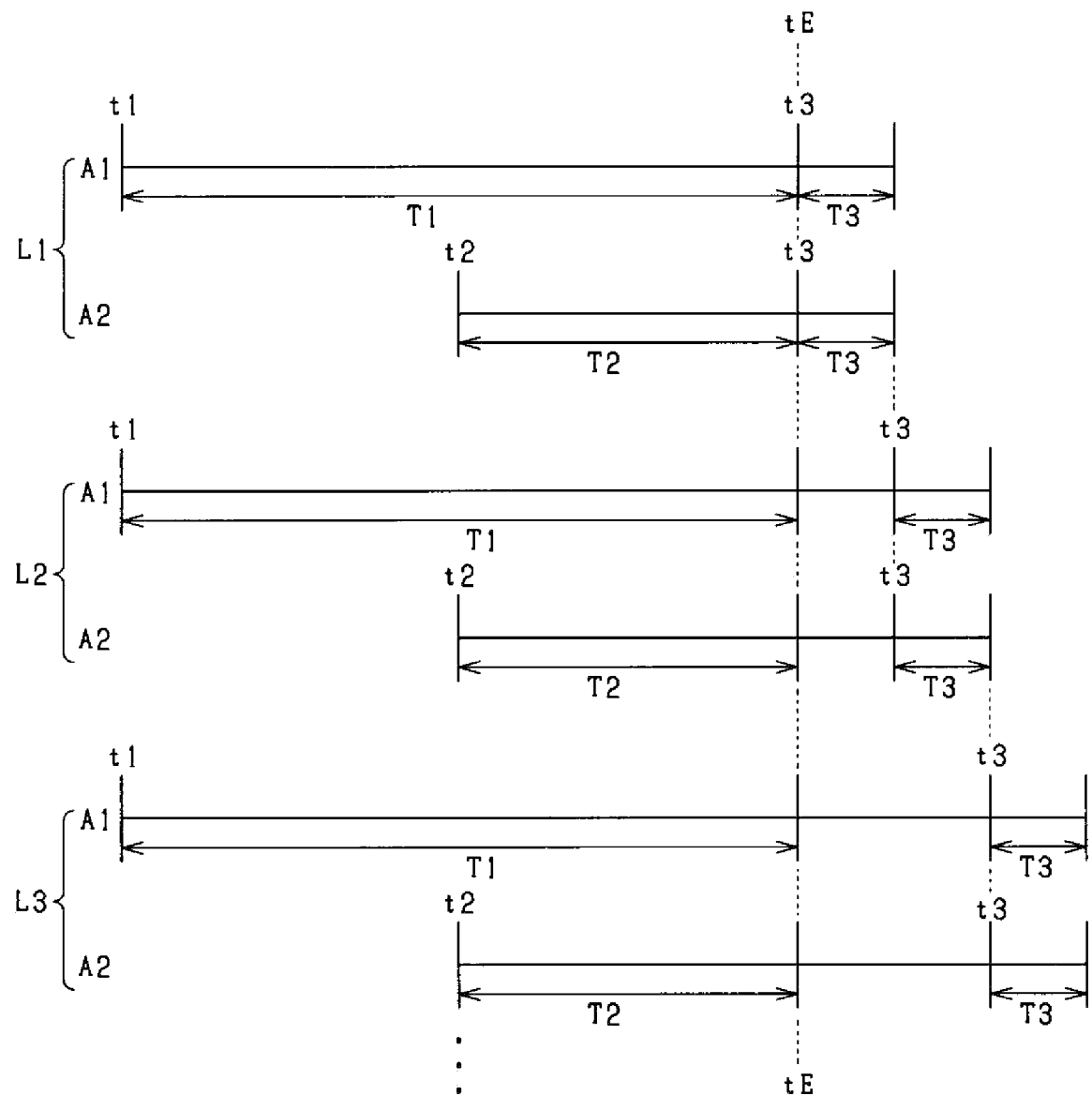
FIG. 6 is a time chart illustrating a control sequence of controlling an electronic front curtain shutter according to the second embodiment of the present disclosure.

FIG. 6 is a time chart schematically illustrating a control sequence performed by the exposure control unit 20 to control the electronic front curtain shutter 13. Here, a reference code t3 illustrated in FIG. 6 is not a timing for closing the shutter 13, but simply is a timing for reading voltage information from the capacitor 152.

As illustrated by a time chart (L1:A1) at the top of FIG. 6, the exposure control unit 20 opens an electronic front curtain shutter 13 at a first timing t1, which is a time earlier than a timing tE at which the rear curtain 138 is closed by a first shutter time T1 for each of the pixels P on the first line L1 belonging to the first image sensor area A1. By contrast, as illustrated by a second time chart (L1:A2) at a second place from the top of FIG. 6, the exposure control unit 20 opens an electronic front curtain shutter 13 at a second timing t2 which is a time earlier than the timing to at which the rear-curtain 138 is closed, by a second shutter time T2, for each of the pixels P on the first line L1 belonging to the second image sensor area A2.

Further, as illustrated in a third time chart (L2:A1) at a third place from the top of FIG. 6, the exposure control unit 20 opens an electronic front curtain shutter 13 at the first timing t1 which is a time earlier than the timing tE at which the second curtain 138 is closed, by the first shutter time T1, for each of pixels P on the second line L2 belonging to the first image sensor area A1. Further, as illustrated in a fourth time chart (L2:A2) at a fourth place from the top of FIG. 6, the exposure control unit 20 opens an electronic front curtain shutter 13 at the second timing t2 which is a time earlier than the timing tE at which the second curtain 138 is closed by the second shutter time T2, for each of the pixels P on the second line L2 belonging to the second image sensor area A2.

That is, the exposure control unit 20 opens the electronic front curtain shutter 13 at the first timing t1 which is a time earlier than the timing tE at which the rear curtain 138 is closed by the first shutter time T1, for each of the pixels P in any one of the lines L1 to Ln belonging to the first image sensor area A1. By contrast, the exposure control unit 20 opens the electronic front curtain shutter 13 at the second timing t2 which is a time earlier than the timing tE at which the rear curtain 138 is closed by the second shutter time T2, for each of the pixels P in any one of the lines L1 to Ln belonging to the second image sensor area A2.

As described heretofore, in any one of the lines L1 to Ln, the first shutter time T1 can be designated for the pixels P belonging to the first image sensor area A1, while the second shutter time T2 can be designated for the pixels P belonging to the second image sensor area A2.

According to this embodiment, since the electronic front curtain shutter 13 includes the mechanical rear curtain 138 and is not a rolling shutter, a so-called rolling shutter phenomenon or the like is not likely to occur. Even In such a camera 50 that employs the electronic front curtain shutter 13, the first shutter time T1 can be designated for each of the pixels P belonging to the first image sensor area A1, and the second shutter time T2 can be designated for each of the pixels P belonging to the second image sensor area A2 at the same time.

Herein below, various modifications will be described briefly. That is, the above-described embodiments can be modified as described hereinbelow.

Figure 8:
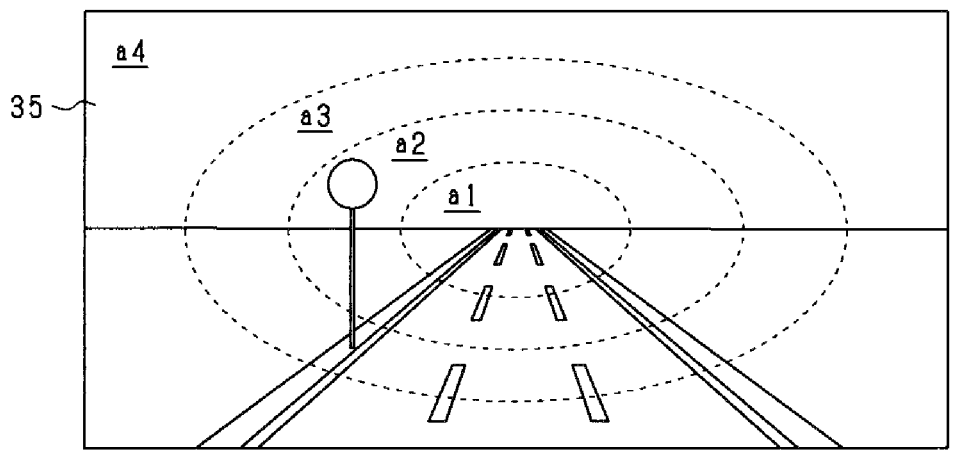
FIG. 8 is a diagram schematically illustrating an image captured by the camera and divided into areas each having a horizontally oval shape according to a second modification of the present disclosure.
Figure 9:
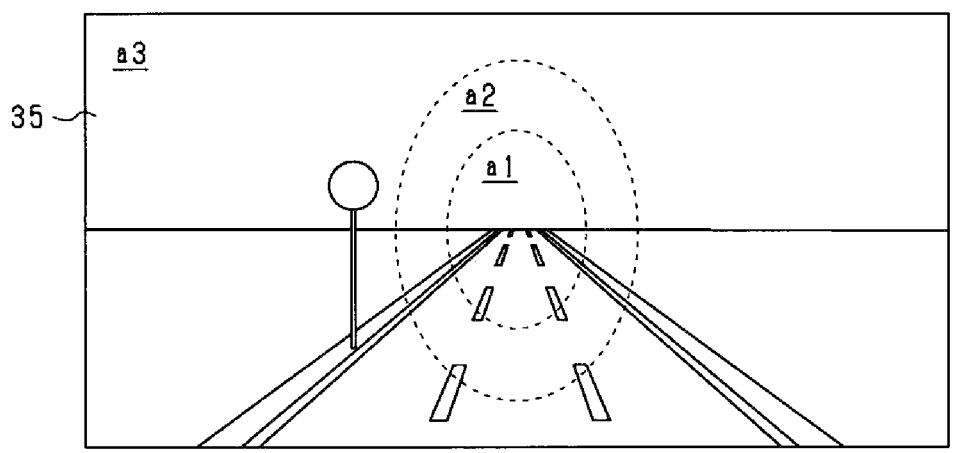
FIG. 9 is a diagram schematically illustrating an image captured by the camera and divided into areas each having a vertically oval shape according to a third modification of the present disclosure.

In the first and second embodiments, the shutter time is designated for each of the areas a1 and a2 obtained by dividing the image 35 into two. However, the present disclosure is not limited thereto, and the image 35 can be divided into three, four or five and more as illustrated in FIGS. 7 to 9, respectively.

Figure 7:
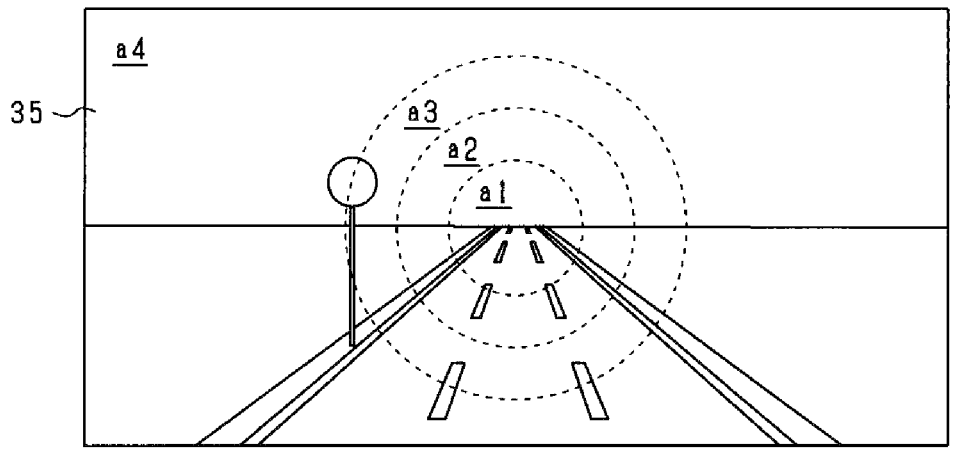
FIG. 7 is a diagram schematically illustrating an image captured by the camera and divided into areas each having a round shape according a first modification of the present disclosure.

In such situations, as illustrated in FIG. 7, a third area a3 can be located outside of a second image area a2, and a fourth area a4 can be located outside of the third area a3, for example. Then, a shutter time shorter than a second shutter time T2 can be used for the third area a3, and a shutter time shorter than the shutter time for the third area a3 can be used for the fourth area a4. Further, a shape of each of the areas a1 to a3 (except for an outermost area) can be circular, horizontally oval, and oval as illustrated in FIGS. 7 to 9, respectively.

Figure 10:
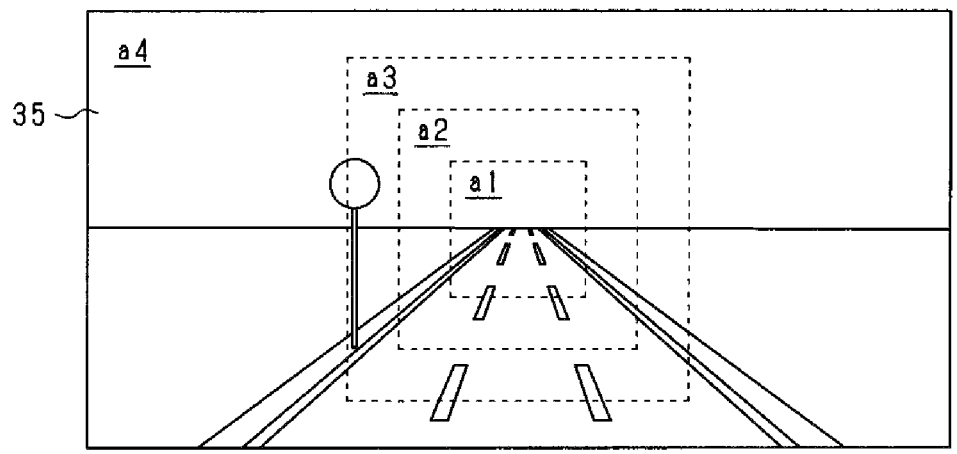
FIG. 10 is a diagram schematically illustrating an image captured by the camera and divided into areas each having a square shape according to a fourth modification of the present disclosure.
Figure 11:
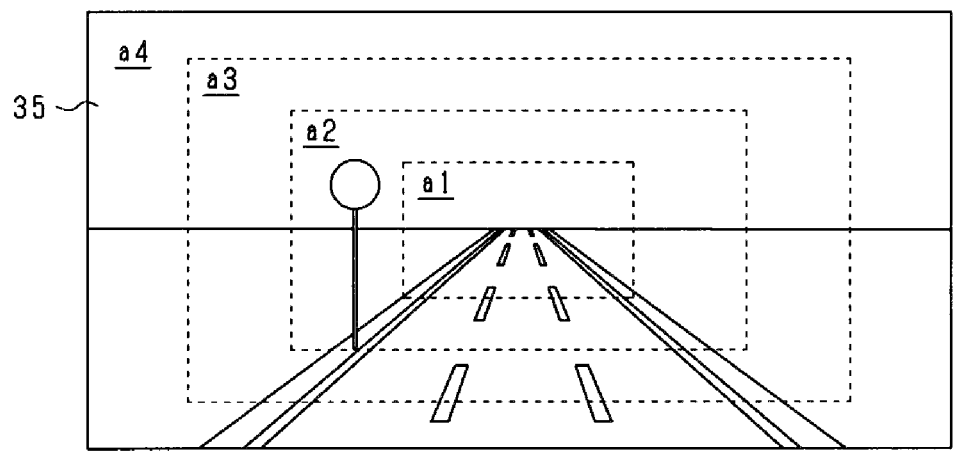
FIG. 11 is a diagram schematically illustrating an image captured by the camera and divided into areas each having a horizontally rectangular shape according to a fifth modification of the present disclosure.
Figure 12:
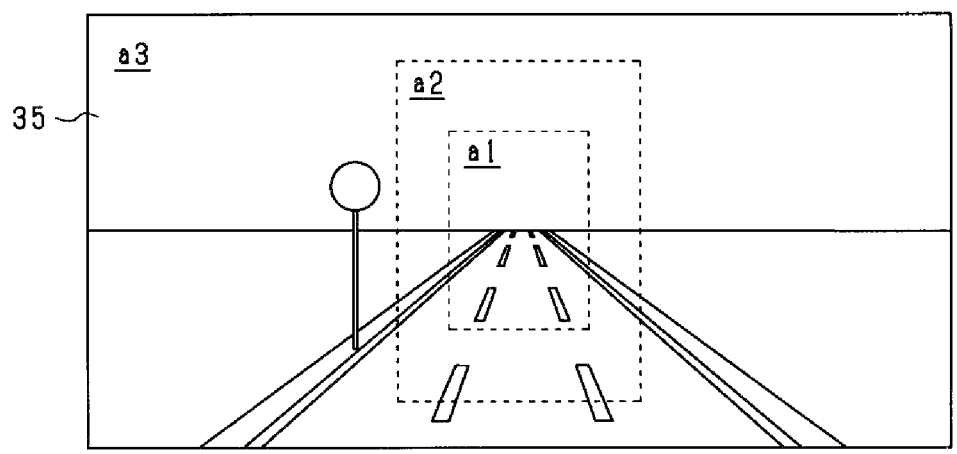
FIG. 12 is a diagram schematically illustrating an image captured by the camera and divided into areas each having a vertically rectangular shape according to a sixth modification of the present disclosure.

Further, the shape of each of the areas a1 to a3 (except for an outermost area) can be a square, a horizontally rectangle as illustrated in FIGS. 10 to 12, respectively.

Figure 13:
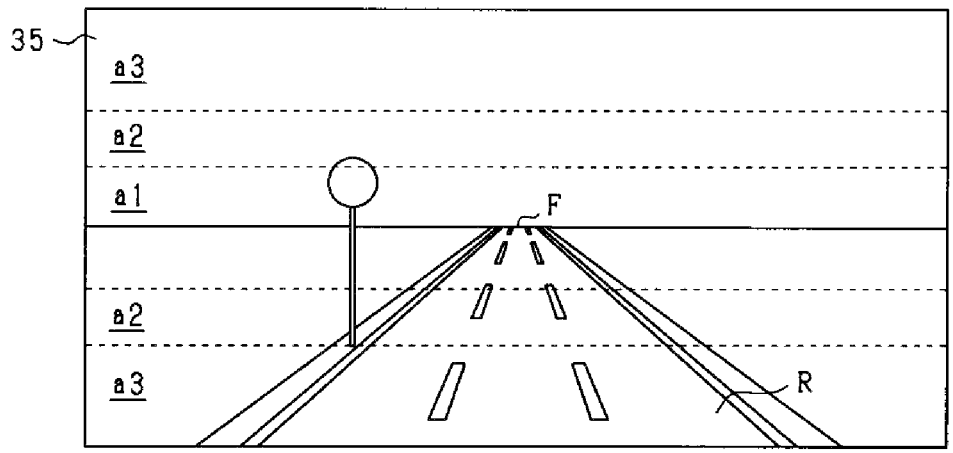
FIG. 13 is a diagram schematically illustrating an image captured by the camera and vertically divided into areas according to a seventh modification of the present disclosure.

Further, in the first embodiment, the area including the infinite portion F in the road R is regarded as the first image area a1, and an outer area thereof is regarded as the second image area a2. However, the present disclosure is not limited thereto, and as illustrated in FIG. 13, upper and lower central areas of the image 35 can be first areas a1, and respective upper and lower areas located upper and lower than these areas can be second areas a2, and more upper and lower areas than the second areas a2 on upper and lower side of the second areas a2 can be third areas a3.

Figure 14:
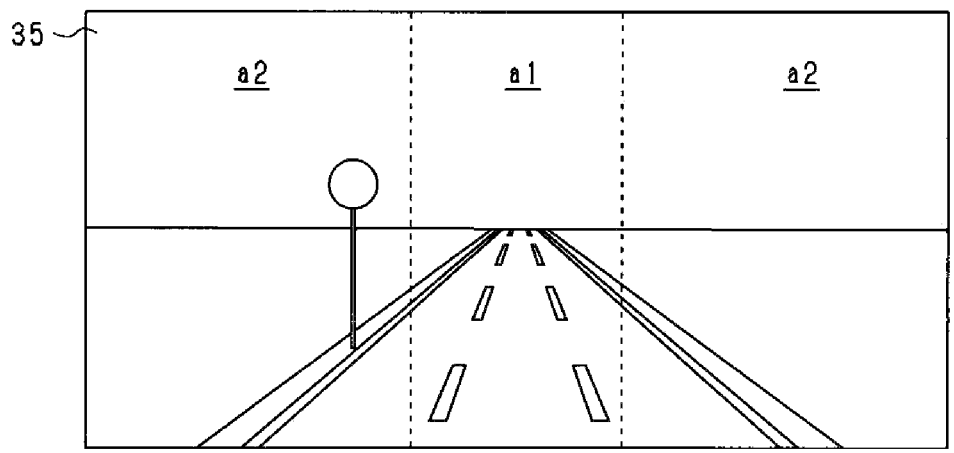
FIG. 14 is a diagram schematically illustrating an image captured by the camera and horizontally divided into areas according to an eighth modification of the present disclosure.
Figure 15:
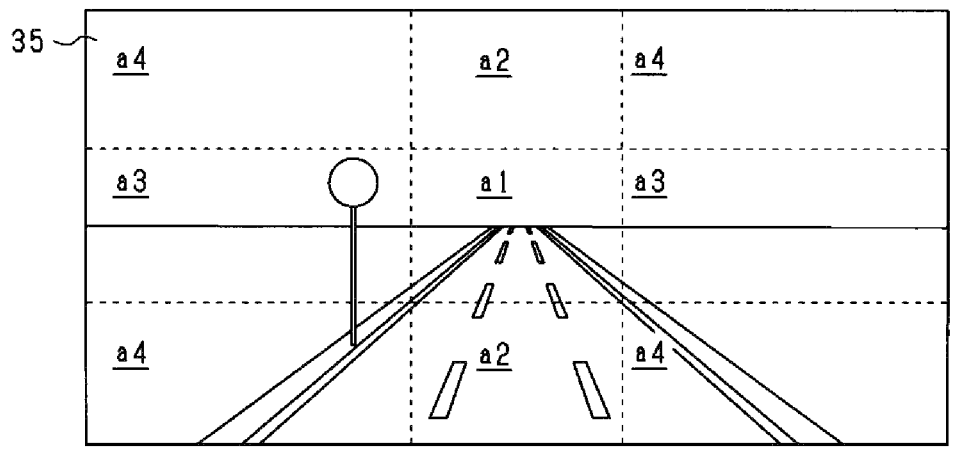
FIG. 15 is a diagram schematically illustrating an image captured by the camera and vertically and horizontally divided into areas according to a ninth modification of the present disclosure.

Further, as illustrated in FIG. 14, a horizontally center area of the image 35 can be a first image area a1, and left and right areas thereof can be second areas a2. Otherwise, as illustrated in FIG. 15, a central area of the image 35 can be a first image area a1, and areas directly above and below the first image area a1 can be second areas a2. At the same time, areas just beside the first image area a1 can be third areas a3, and areas other than from the first image area a1 to the third area a3 can be fourth areas a4.

Figure 16:
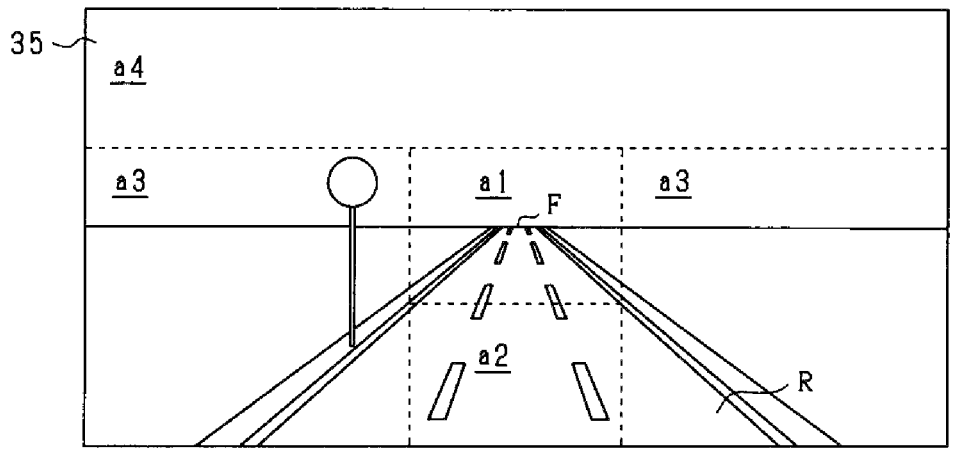
FIG. 16 is a diagram schematically illustrating an image captured by the camera and irregularly divided into areas according to a tenth modification of the present disclosure.

Further, as illustrated in FIG. 16, a central area of the image 35 can be a first image area a1, and an area directly below the first image area a1 can be a second image area a2. At the same time, areas just beside each of the first image area a1 and the second image area a2 can be third areas a3, and an area other than from the first image area a1 to the third area a3 can be a fourth area a4.

Figure 17:
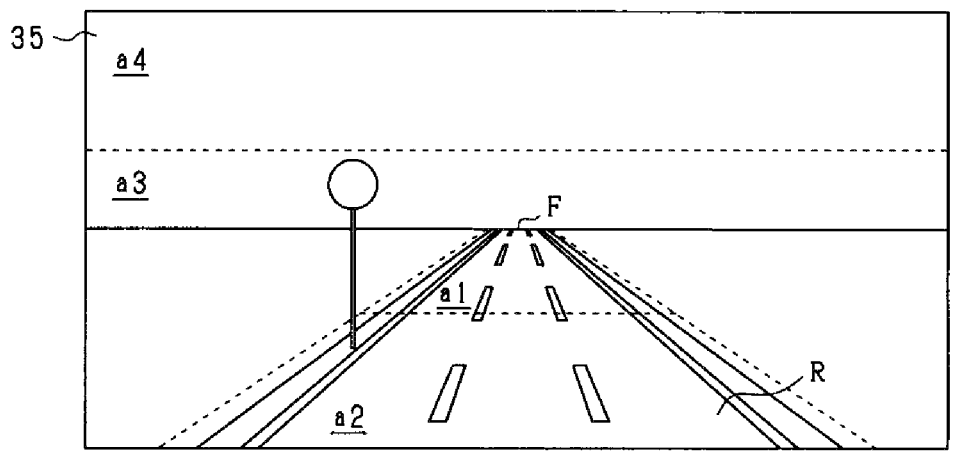
FIG. 17 is a diagram schematically illustrating an image captured by the camera and irregularly divided into areas according to an eleventh modification of the present disclosure.

Further, as illustrated in FIG. 17, when a road R linearly extends in a running direction of an own vehicle, an upper half of an area on the road R can be a first image area a1, and a lower half of the area can be a second image area a2. Further, an upper area located upper than the first image area a1 can be a third area a3, and an upper area located upper than the third area a3 can be a fourth area a4.

Figure 18:
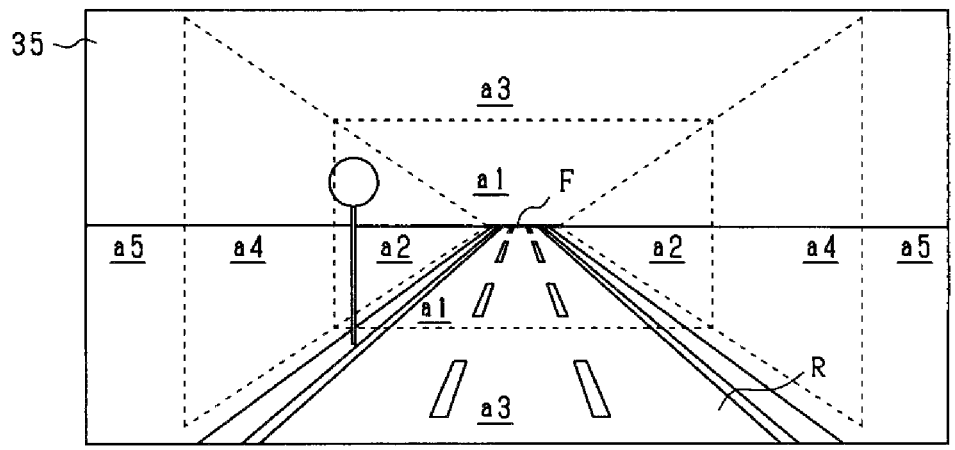
FIG. 18 is a diagram schematically illustrating an image captured by the camera and irregularly divided into areas according to a twelfth modification of the present disclosure.

Further, as illustrated in FIG. 18, when a road R linearly extends in a running direction of an own vehicle, an upper half area on the road R and an area obtained by vertically inverting the upper half area about an axis of an infinite distance section F can be first areas a1. Further, a lower half area on the road R and an area obtained by vertically inverting the lower half area about the axis of the infinite distance section F can be third areas a3. Then, areas vertically sandwiched by the first areas a1, respectively, can be second areas a2, and areas vertically sandwiched by the third areas a3 beside the second areas a2, respectively, can be fourth areas a4. At the same time, areas except for the areas from the first areas a1 to the fourth areas a4 can be fifth areas a5, respectively.

Further, in the first and second embodiments, when the road R linearly extends in the running direction of the own vehicle, the area including the infinite portion F of the road R is regarded as the first image area a1. However, the present disclosure is not limited thereto, and the exposure control unit 20 can recognize the road R by performing image recognition, and may regard an area including an infinite portion F of the road R at a center thereof as the first image area a1.

Figure 19A:
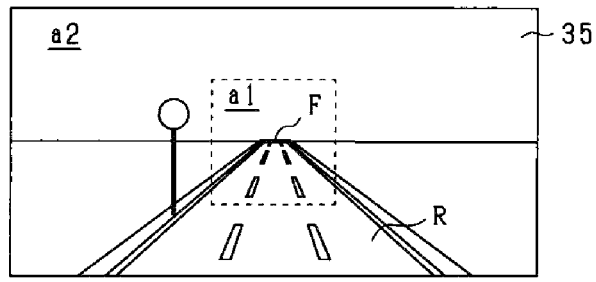
FIGS. 19A to 19E are diagrams each schematically illustrating displacement of a target area in an image captured by the camera according thirteenth modification of the present disclosure.
Figure 19B:
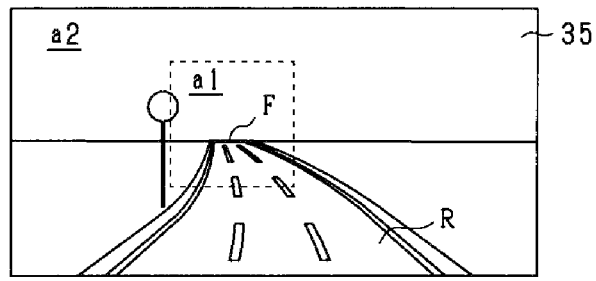
Figure 19C:
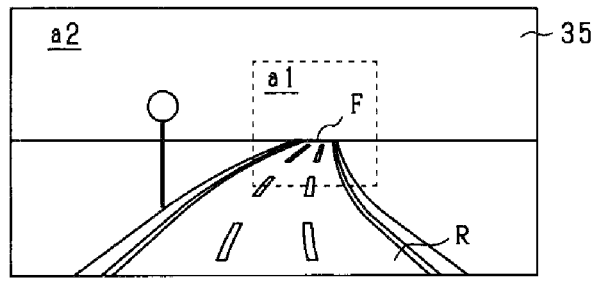
Figure 19D:
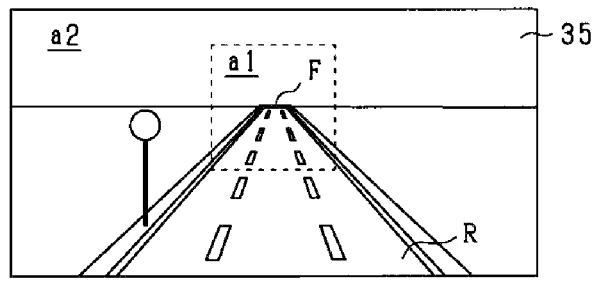
Figure 19E:
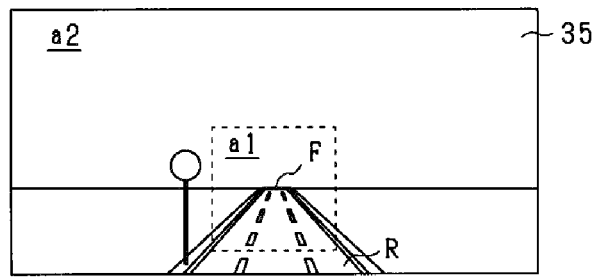

With such recognition, when a road R linearly extends as illustrated in FIG. 19A, a central area of the image 35 serves as the first image area a1. By contrast, when the road R turns to the left as illustrated in FIG. 19B, an area in the image 35 deviated to the left from a vertical center of the image 35 serves as the first image area a1. Similarly, when the road R turns to the right as illustrated in FIG. 19C, an area in the image 35 deviated to the right from the vertical center of the image 35 serves as the first image area a1. Further, as illustrated in FIG. 19D, when a rising gradient of the road R is larger at a forward location than that at a location at which the own vehicle is currently running, an area in the image 35 deviated to an upper side from a horizontal center serves as the first image area a1. For example, when either an uphill is coming from the forward location while the own vehicle is traveling along a flat ground or a flat ground is coming from the forward location while the own vehicle is traveling along a downhill, an area in the image 35 deviated to the upper side from the horizontal center serves as the first image area a1. By contrast, as illustrated in FIG. 19E, when a falling gradient of a forward location of the road R is larger than that at a cite at which the own vehicle is currently traveling, an area within the image 35 deviated to a lower side from the horizontal center serves as the first image area a1. For example, when either a downhill is coming while the own vehicle is traveling along a flat ground or a flat ground is coming while the own vehicle is traveling along the uphill, an area within the image 35 deviated to the lower side from the horizontal center serves as the first image area a1.

Further, as illustrated in FIG. 1, In the first embodiment, the exposure control unit 20 includes the vehicle speed acquirer 21, the yaw rate acquirer 22, and the optical flow acquirer 23, and changes the shutter times T1 and T2 for the respective areas A1 and A2 based on the speed, the yaw rate, and the optical flow of the own vehicle. However, the present disclosure is not limited thereto, and some or all of the vehicle speed acquirer 21, the yaw rate acquirer 22, and the optical flow acquirer 23 can be omitted. Specifically, a change in shutter time caused by each of the some or all of the acquirers 21 to 23 can be omitted.

Further, In the first and second embodiments, the exposure control unit 20 determines the shutter time for each of the areas based on the blurring. However, the present disclosure is not limited thereto, and the shutter time of each of the areas can be determined based on the SNR. For example, a shutter time for an area, where the SNR is of relatively higher priority can be longer than a shutter time for an area where the SNR is of relatively normal priority.

Further, In the first and second embodiments, the camera 50 captures images of a forward location from the own vehicle. However, the present disclosure is not limited thereto, and can capture images of either a rear location of the own vehicle or a location other than the rear location.

Numerous additional modifications and variations of the present disclosure are possible in light of the above teachings. It is hence to be understood that within the scope of the appended claims, the present disclosure may be performed otherwise than as specifically described herein. For example, the present disclosure is not limited to the above-described in-vehicle camera and may be altered as appropriate. Further, the present disclosure is not limited to the above-described method of capturing images of an outside scenery and may be altered as appropriate as well.

What is claimed is:

1. An in-vehicle camera mountable on an own vehicle to capture images of an outside scenery from the own vehicle, the in-vehicle camera comprising:

an image sensor having multiple pixels to collect optical information, the image sensor comprising multiple image sensor areas;

an electronic front curtain shutter with an electronic front curtain and a rear curtain, the shutter opening when collection of the optical information is started by electronic control;

an image processing unit to generate an image based on the optical information as collected; and an exposure control unit to control the shutter to allow a shutter time, during which the shutter is open, to be different in accordance with the respective image sensor area of the multiple image sensor areas, wherein the exposure control unit includes a vehicle speed acquirer to acquire a speed of the own vehicle, and wherein the exposure control unit controls the shutter to allow a shutter time for each of the multiple image sensor areas to be shorter when the own vehicle runs at or faster than a given speed than when the own vehicle runs slower than the given speed.

2. The in-vehicle camera as claimed in claim 1, wherein the multiple image sensor areas comprise a first image sensor area and a second image sensor area, and wherein the exposure control unit controls the shutter to allow a second shutter time for the second image sensor area to be shorter than a first shutter time for the first image sensor area, the second image sensor area causing greater blurring than the first image sensor area when the own vehicle runs.

3. The in-vehicle camera as claimed in claim 1,
wherein the multiple image sensor areas comprise a first image sensor area and a second image sensor area,
wherein the second image sensor area captures images of the vicinity of the own vehicle, and the first image sensor area captures images of an outside scenery other than the vicinity of the own vehicle,
wherein the exposure control unit controls the shutter to allow a second shutter time for the second image sensor area to be shorter than a first shutter time for the first image sensor area.

4. The in-vehicle camera as claimed in claim 1, wherein the exposure control unit includes an optical flow acquirer to acquire an optical flow as movement of a subject,
wherein the exposure control unit changes the shutter time of the respective image sensor area based on the optical flow.

5. An in-vehicle camera mountable on an own vehicle to capture images of an outside scenery from an own vehicle, the in-vehicle camera comprising:
an image sensor having multiple pixels to collect optical information, the image sensor comprising multiple image sensor areas;
an electronic front curtain shutter with an electronic front curtain and a rear curtain, the shutter opening when collection of the optical information is started by electronic control;
an image processing unit to generate an image based on the optical information as collected; and
an exposure control unit to control the shutter to allow a shutter time, during which the shutter is open, to be different in accordance with the respective image sensor area of the multiple image sensor areas,
wherein the multiple image sensor areas comprise a first image sensor area and a second image sensor area,
wherein the second image sensor area captures images of the vicinity of the own vehicle, and the first image sensor area captures images of an outside scenery other than the vicinity of the own vehicle,
wherein the exposure control unit controls the shutter to allow a second shutter time for the second image sensor area to be shorter than a first shutter time for the first image sensor area,
wherein the exposure control unit includes a vehicle speed acquirer to acquire a speed of the own vehicle, and
wherein the exposure control unit controls the shutter to allow a difference in shutter time between the first image sensor area and the second image sensor area to be larger when the own vehicle runs at or faster than the given speed than when the own vehicle runs slower than the given speed.

6. An in-vehicle camera mountable on an own vehicle to capture images of an outside scenery from an own vehicle, the in-vehicle camera comprising:
an image sensor having multiple pixels to collect optical information, the image sensor comprising multiple image sensor areas;
an electronic front curtain shutter with an electronic front curtain and a rear curtain, the shutter opening when collection of the optical information is started by electronic control;
an image processing unit to generate an image based on the optical information as collected; and
an exposure control unit to control the shutter to allow a shutter time, during which the shutter is open, to be different in accordance with the respective image sensor area of the multiple image sensor areas,
wherein the exposure control unit includes a yaw rate acquirer to acquire a yaw rate of the own vehicle, and
wherein the exposure control unit controls the shutter to allow the shutter time in each of the multiple image sensor areas to be shorter when the yaw rate is equal to or larger than a given rate than when the yaw rate is smaller than the given rate.

7. The in-vehicle camera as claimed in claim 6, wherein the exposure control unit includes a vehicle speed acquirer to acquire a speed of the own vehicle,
wherein the exposure control unit controls the shutter to allow a shutter time for each of the multiple image sensor areas to be shorter when the own vehicle runs at or faster than a given speed than when the own vehicle runs slower than the given speed.

8. An in-vehicle camera mountable on an own vehicle to capture images of an outside scenery from an own vehicle, the in-vehicle camera comprising:
an image sensor having multiple pixels to collect optical information, the image sensor comprising multiple image sensor areas;
an electronic front curtain shutter with an electronic front curtain and a rear curtain, the shutter opening when collection of the optical information is started by electronic control;
an image processing unit to generate an image based on the optical information as collected; and
an exposure control unit to control the shutter to allow a shutter time, during which the shutter is open, to be different in accordance with a respective image sensor area of the multiple image sensor areas,
wherein the exposure control unit includes an optical flow acquirer to acquire an optical flow as movement of a subject,
wherein the exposure control unit changes the shutter time of the respective image sensor area based on the optical flow, and
wherein the exposure control unit controls the shutter to allow a shutter time to be shorter in at least an image sensor area of the multiple image sensor areas where a given moving body is recognized based on the optical flow than a shutter time used for an image sensor area of the multiple image sensor areas where the moving body is not recognized.

9. An in-vehicle camera mountable on an own vehicle to capture images of an outside scenery from an own vehicle, the in-vehicle camera comprising:
an image sensor having multiple pixels to collect optical information, the image sensor comprising multiple image sensor areas;
an electronic front curtain shutter with an electronic front curtain and a rear curtain, the shutter opening when collection of the optical information is started by electronic control;
an image processing unit to generate an image based on the optical information as collected; and
an exposure control unit to control the shutter to allow a shutter time, during which the shutter is open, to be different in accordance with the respective image sensor area of the multiple image sensor areas,
wherein the shutter is an electronic rolling shutter having the electronic front curtain and an electronic rear curtain, wherein the multiple pixels are separated into groups of lines each composed of a given number of pixels, wherein the electronic shutter is closed when reading of the optical information collected in each of the lines is started, wherein the electronic shutter is closed at a different time per line, wherein the multiple image sensor areas comprise a first image sensor area and a second image sensor area, wherein the image sensor has the first image sensor area for which a first shutter time is used, and the second image sensor area for which a second shutter time is used, wherein the exposure control unit opens the electronic shutter for a line of image sensors with pixels belonging to the first image sensor area at a first timing, which is earlier than a third timing by the first shutter time, the third timing being a time at which the electronic shutter is closed in the line, and wherein the exposure control unit opens the electronic shutter for a line of image sensors with pixels belonging to the second image sensor area at a second timing, which is earlier than the third timing by the second shutter time.

10. An in-vehicle camera mountable on an own vehicle to capture images of an outside scenery from an own vehicle, the in-vehicle camera comprising:

an image sensor having multiple pixels to collect optical information, the image sensor comprising multiple image sensor areas;

an electronic front curtain shutter with an electronic front curtain and a rear curtain, the shutter opening when collection of the optical information is started by electronic control;

an image processing unit to generate an image based on the optical information as collected; and an exposure control unit to control the shutter to allow a shutter time, during which the shutter is open, to be different in accordance with the respective image sensor area of the multiple image sensor areas, wherein the shutter is an electronic front curtain shutter composed of the electronic front curtain and a rear mechanical curtain, wherein the multiple image sensor areas comprise a first image sensor area and a second image sensor area, wherein the image sensor has the first image sensor area for which a first shutter time is used and the second image sensor area for which a second shutter time is used, wherein the first image sensor area and the second image sensor area with multiple pixels, respectively, are separated into groups of lines each composed of a given number of pixels, wherein the electronic shutter is closed when reading of the optical information collected in each of the lines is started, wherein the exposure control unit opens the electronic front curtain shutter at a first timing for lines each composed of a given number of pixels belonging to the first image sensor area, the first timing being earlier than a closing timing for closing the rear mechanical curtain by the first shutter time, wherein the exposure control unit opens the electronic front curtain shutter at a second timing for lines each composed of a given number of pixels belonging to the second image sensor area, and wherein the second timing being a time earlier than the closing timing for closing the rear mechanical curtain by the second shutter time.

11. A method of capturing images of an outside scenery with an in-vehicle camera mountable on an own vehicle, the method comprising:

capturing images of an outside scenery as optical information in an image sensor with multiple pixels, the image sensor comprising multiple image sensor areas;

collecting the optical information by opening an electronic front curtain shutter composed of an electronic front curtain and a rear curtain;

generating an image based on the optical information as collected; and controlling the electronic front curtain shutter to allow a shutter time, during which the shutter is open, to be different in accordance with the respective image sensor area of the multiple image sensor areas, wherein a speed of the own vehicle is acquired, and wherein the shutter is controlled to allow a shutter time for each of the multiple image sensor areas to be shorter for a state in which the own vehicle runs at or faster than a given speed than for a state in which the own vehicle runs slower than the given speed.

12. The method of capturing images as claimed in claim 11, wherein the multiple image sensor areas comprise a first image sensor area and a second image sensor area, and wherein the shutter is controlled to allow a second shutter time for the second image sensor area to be shorter than a first shutter time for the first image sensor area, the second image sensor area causing greater blurring than the first image sensor area for a state in which the own vehicle runs.

13. The method of capturing images as claimed in claim 11, wherein the multiple image sensor areas comprise a first image sensor area and a second image sensor area, wherein the second image sensor area captures images of the vicinity of the own vehicle, and the first image sensor area captures images of an outside scenery other than the vicinity of the own vehicle, and wherein the shutter is controlled to allow a second shutter time for the second image sensor area to be shorter than a first shutter time for the first image sensor area.

14. The method of capturing images as claimed in claim 11, wherein an optical flow is acquired as movement of a subject, wherein the shutter time of the respective image sensor area is changed based on the optical flow.

15. A method of capturing images of an outside scenery with an in-vehicle camera mountable on an own vehicle, the method comprising:

capturing images of an outside scenery as optical information in an image sensor with multiple pixels, the image sensor comprising multiple image sensor areas;

collecting the optical information by opening an electronic front curtain shutter composed of an electronic front curtain and a rear curtain;

generating an image based on the optical information as collected; and controlling the electronic front curtain shutter to allow a shutter time, during which the shutter is open, to be different in accordance with the respective image sensor area of the multiple image sensor areas, wherein the multiple image sensor areas comprise a first image sensor area and a second image sensor area, wherein the second image sensor area captures images of the vicinity of the own vehicle, and the first image sensor area captures images of an outside scenery other than the vicinity of the own vehicle, wherein the shutter is controlled to allow a second shutter time for the second image sensor area to be shorter than a first shutter time for the first image sensor area, wherein a speed of the own vehicle is acquired, and wherein the shutter is controlled to allow a difference in shutter time between the first and the second image sensor area to be larger for a state in which the own vehicle runs at or faster than the given speed than for a state in which the own vehicle runs slower than the given speed.

16. A method of capturing images of an outside scenery with an in-vehicle camera mountable on an own vehicle, the method comprising:

capturing images of an outside scenery as optical information in an image sensor with multiple pixels, the image sensor comprising multiple image sensor areas;

collecting the optical information by opening an electronic front curtain shutter composed of an electronic front curtain and a rear curtain;

generating an image based on the optical information as collected; and controlling the electronic front curtain shutter to allow a shutter time, during which the shutter is open, to be different in accordance with the respective image sensor area of the multiple image sensor areas, wherein a yaw rate of the own vehicle is acquired, and wherein the shutter is controlled to allow the shutter time in each of the multiple image sensor areas to be shorter for a state in which the yaw rate is equal to or larger than a given rate than for a state in which the yaw rate is smaller than the given rate.

17. The method of capturing images as claimed in claim 16, wherein a speed of the own vehicle is acquired, wherein the shutter is controlled to allow a shutter time for each of the multiple image sensor areas to be shorter for a state in which the own vehicle runs at or faster than a given speed than for a state in which the own vehicle runs slower than the given speed.

18. A method of capturing images of an outside scenery with an in-vehicle camera mountable on an own vehicle, the method comprising:

capturing images of an outside scenery as optical information in an image sensor with multiple pixels, the image sensor comprising multiple image sensor areas;

collecting the optical information by opening an electronic front curtain shutter composed of an electronic front curtain and a rear curtain;

generating an image based on the optical information as collected; and controlling the electronic front curtain shutter to allow a shutter time, during which the shutter is open, to be different in accordance with a respective image sensor area of the multiple image sensor areas, wherein an optical flow is acquired as movement of a subject, wherein the shutter time of the respective image sensor area is changed based on the optical flow, and wherein the shutter is controlled to allow a shutter time to be shorter in at least an image sensor area of the multiple image sensor areas where a given moving body is recognized based on the optical flow than a shutter time used for an image sensor area of the multiple image sensor areas where the moving body is not recognized.

19. A method of capturing images of an outside scenery with an in-vehicle camera mountable on an own vehicle, the method comprising:

capturing images of an outside scenery as optical information in an image sensor with multiple pixels, the image sensor comprising multiple image sensor areas;

collecting the optical information by opening an electronic front curtain shutter composed of an electronic front curtain and a rear curtain;

generating an image based on the optical information as collected; and controlling the electronic front curtain shutter to allow a shutter time, during which the shutter is open, to be different in accordance with the respective image sensor area of the multiple image sensor areas, wherein the shutter is an electronic rolling shutter having the electronic front curtain and an electronic rear curtain, wherein the multiple pixels are separated into groups of lines each composed of a given number of pixels, wherein the electronic shutter is closed for a state in which reading of the optical information collected in each of the lines is started, wherein the electronic shutter is closed at a different time per line, wherein the multiple image sensor areas comprise a first image sensor area and a second image sensor area, wherein the image sensor has the first image sensor area for which a first shutter time is used, and the second image sensor area for which a second shutter time is used, wherein the electronic shutter is opened for a line of image sensors with pixels belonging to the first image sensor area at a first timing, which is earlier than a third timing by the first shutter time, the third timing being a time at which the electronic shutter is closed in the line, and wherein opens the electronic shutter is opened for a line of image sensors with pixels belonging to the second image sensor area at a second timing, which is earlier than the third timing by the second shutter time.

20. A method of capturing images of an outside scenery with an in-vehicle camera mountable on an own vehicle, the method comprising:

capturing images of an outside scenery as optical information in an image sensor with multiple pixels, the image sensor comprising multiple image sensor areas;

collecting the optical information by opening an electronic front curtain shutter composed of an electronic front curtain and a rear curtain;

generating an image based on the optical information as collected; and controlling the electronic front curtain shutter to allow a shutter time, during which the shutter is open, to be different in accordance with the respective image sensor area of the multiple image sensor areas, wherein the shutter is an electronic front curtain shutter composed of the electronic front curtain and a rear mechanical curtain, wherein the multiple image sensor areas comprise a first image sensor area and a second image sensor area, wherein the image sensor has the first image sensor area for which a first shutter time is used and the second image sensor area for which a second shutter time is used, wherein the first image sensor area and the second image sensor area with multiple pixels, respectively, are separated into groups of lines each composed of a given number of pixels, wherein the electronic shutter is closed for a state in which reading of the optical information collected in each of the lines is started, wherein the electronic front curtain shutter is opened at a first timing for lines each composed of a given number of pixels belonging to the first image sensor area, the first timing being earlier than a closing timing for closing the rear mechanical curtain by the first shutter time, wherein the electronic front curtain shutter is opened at a second timing for lines each composed of a given number of pixels belonging to the second image sensor area, and the second timing being a time earlier than the closing timing for closing the rear mechanical curtain by the second shutter time.

* * * * *